(12) United States Patent
Yamamoto et al.

(10) Patent No.: US 7,179,997 B2
(45) Date of Patent: Feb. 20, 2007

(54) WIRE HARNESS INSTALLATION STRUCTURE

(75) Inventors: Masaki Yamamoto, Ogasa-gun (JP); Edwin Ang Martinez, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/290,421

(22) Filed: Dec. 1, 2005

(65) Prior Publication Data

US 2006/0141810 A1 Jun. 29, 2006

(30) Foreign Application Priority Data

Dec. 1, 2004 (JP) .......................... P. 2004-348426

(51) Int. Cl.
*H02G 3/00* (2006.01)
(52) U.S. Cl. ................. 174/72 A; 174/71 R; 174/72 R
(58) Field of Classification Search .............. 174/71 R, 174/72 A, 72 R; 191/22 R, 23 R, 44
See application file for complete search history.

(56) References Cited

U.S. PATENT DOCUMENTS

| 1,837,962 | A | * | 12/1931 | Hensgen | .................... | 174/72 A |
| 2,299,140 | A | * | 10/1942 | Hanson | .................... | 174/72 A |
| 3,055,971 | A | * | 9/1962 | Lander | .................... | 174/72 A |
| 3,128,214 | A | * | 4/1964 | Lay | .................... | 174/72 A |
| 3,984,622 | A | * | 10/1976 | Ross | .................... | 174/72 A |
| 4,280,062 | A | * | 7/1981 | Miller et al. | .................... | 174/72 A |
| 5,367,126 | A | * | 11/1994 | Kikuchi | .................... | 174/71 R |
| 5,460,530 | A | * | 10/1995 | Toba et al. | .................... | 174/72 A |
| 5,954,538 | A | | 9/1999 | Huang | | |
| 5,994,645 | A | * | 11/1999 | Suzuki et al. | .................... | 174/72 A |
| 6,259,027 | B1 | | 7/2001 | Watanabe | | |
| 6,291,770 | B1 | * | 9/2001 | Casperson | .................... | 174/72 A |
| 6,621,688 | B1 | * | 9/2003 | Burdick | .................... | 174/72 A |

FOREIGN PATENT DOCUMENTS

| EP | 1 110 796 A1 | 6/2001 |
| JP | 8-107618 A | 4/1996 |
| JP | 8-140242 A | 5/1996 |
| JP | 8-282406 A | 10/1996 |
| JP | 8-340618 A | 12/1996 |
| JP | 9-19031 A | 1/1997 |

* cited by examiner

*Primary Examiner*—Dean A. Reichard
*Assistant Examiner*—Adolfo Nino
(74) *Attorney, Agent, or Firm*—Sughrue Mion, PLLC

(57) ABSTRACT

In a wire harness installation structure, a main wire W1 of a wire harness WH is installed in such a manner that it is fixed to a vehicle body panel 1, and an electric connection box 2 is connected to a branch wire W2 branching off from the main wire W1 of the wire harness WH, and the electric connection box 2 is mounted in a predetermined receiving position within a vehicle body. The branch wire W2 is installed along a bottom surface 2a of the electric connection box 2, and is connected at its distal end S to a portion of the bottom surface 2a of the electric connection box 2 which is spaced a distance, larger than the shortest distance between a branching position P of the branch wire W2 and the electric connection box, from the branching position P.

3 Claims, 3 Drawing Sheets

WIRE HARNESS INSTALLATION STRUCTURE

BACKGROUND OF THE INVENTION

1. Field of the Invention

This invention relates to a wire harness installation structure in which a branch wire of a wire harness is connected to a mounting part such as an electric connection box.

2. Related Art

There have been proposed various electric connection boxes or the like for mounting on a vehicle (see, for example, JP-A-8-107618). Among such electric connection boxes, there is the type which is connected to a branch wire of a wire harness, and this conventional example is shown in FIG. 3.

As shown in FIG. 3, a main wire 50 of the wire harness WH is fixed to a vehicle body panel 51, and is installed along a predetermined path. The branch wire 52 branches off from the wire harness WH, and this branch wire 52 is connected to the electric connection box 53. The electric connection box 53 is mounted in a predetermined receiving position within a vehicle body.

However, in the conventional structure of installing the wire harness WH, the branch wire 52, branching off from the wire harness WH, was connected to that portion of the electric connection box 53 which was disposed the nearest to a branching position P than the other portion thereof. Therefore, the length of the branch wire 52 was short, and an operation for connecting the branch wire 52 to the electric connection box 53 and other operations could be carried out only at the receiving position (where the electric connection box 53 is received) and its vicinity.

And besides, the electric connection box 53, connected to the branch wire 52, could hardly be moved from the receiving position during the mounting operation, and therefore the operations for mounting and removing the electric connection box 53 and other operations were cumbersome. Particularly when the length of the branch wire 52 was smaller than the predetermined length because of a design error or the like and when the main wire 50 and the branch wire 52 were both thick, the above operations were very cumbersome.

SUMMARY OF THE INVENTION

Therefore, this invention has been made in order to solve the above problems, and an object of the invention is to provide a wire harness installation structure in which operations for mounting and removing a mounting part and other operations can be easily carried out.

According to the present invention, there is provided a wire harness installation structure wherein a main wire of a wire harness is installed in such a manner that it is fixed to a vehicle body panel, and a mounting part is connected to a branch wire branching off from the main wire of the wire harness, and the mounting part is mounted in a predetermined receiving position within a vehicle body; provided in that the branch wire is connected to a portion of the mounting part which is spaced a distance, larger than the shortest distance between a branching position of the branch wire and the mounting part, from the branching position in a mounted condition of the mounting part, and is disposed on other surface of the mounting part than a surface thereof which extends just upwardly from a portion of the mounting part disposed the nearest to the branching position.

The wire harness installation structure of the present invention is provided in that the branch wire is installed along a lower surface of the mounting part such that the branch wire is led from the branching position to a portion of the lower surface which is spaced a distance, larger than the shortest distance between the branching position and the mounting part, from the branching position.

According to the present invention, the branch wire has such a length that it extends from the branching position of the main wire of the wire harness to the portion of the mounting part which is spaced a distance, larger than the shortest distance between the branching position and the mounting part, from the branching position. An operation for connecting the branch wire to the mounting part can be carried out at a position into which the mounting part is drawn from the receiving position. And besides, during an operation for mounting the mounting part connected to the branch wire, the mounting part can be somewhat moved freely because of the sufficiently-long branch wire. Therefore the operations for mounting and removing the mounting part and other operations can be carried out easily.

According to the present invention, a space for receiving the branch wire is hardly necessary, and the mounting part can be received in a receiving space which is generally equal to that used in the conventional structure. And besides, when the mounting part is moved from the receiving position toward the drawing position, the branch wire is also drawn, following the mounting part. In the operation for drawing the mounting part, it is not necessary to take the existence of the branch wire into consideration.

DETAILED DESCRIPTION OF THE PREFERRED EMBODIMENTS

One preferred embodiment of the present invention will now be described with reference to the drawings.

Figure 1:
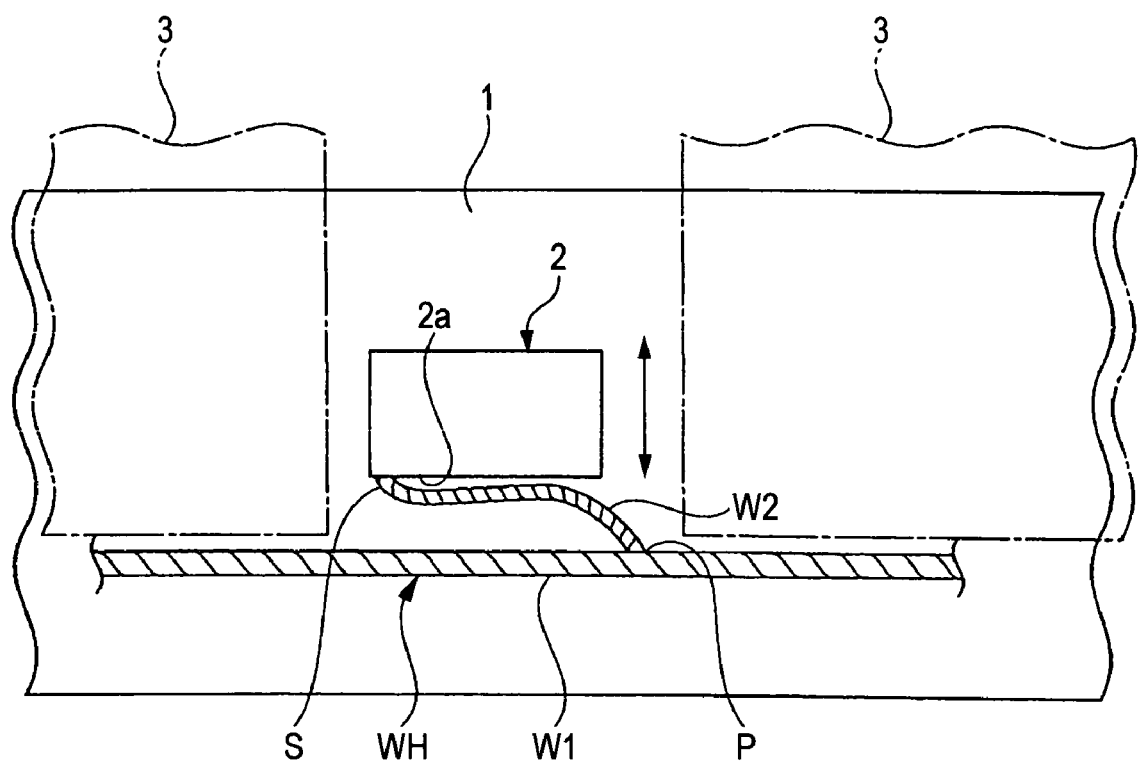
FIG. 1 is a view showing one preferred embodiment of a wire harness installation structure of the present invention, showing its construction.
Figure 2:
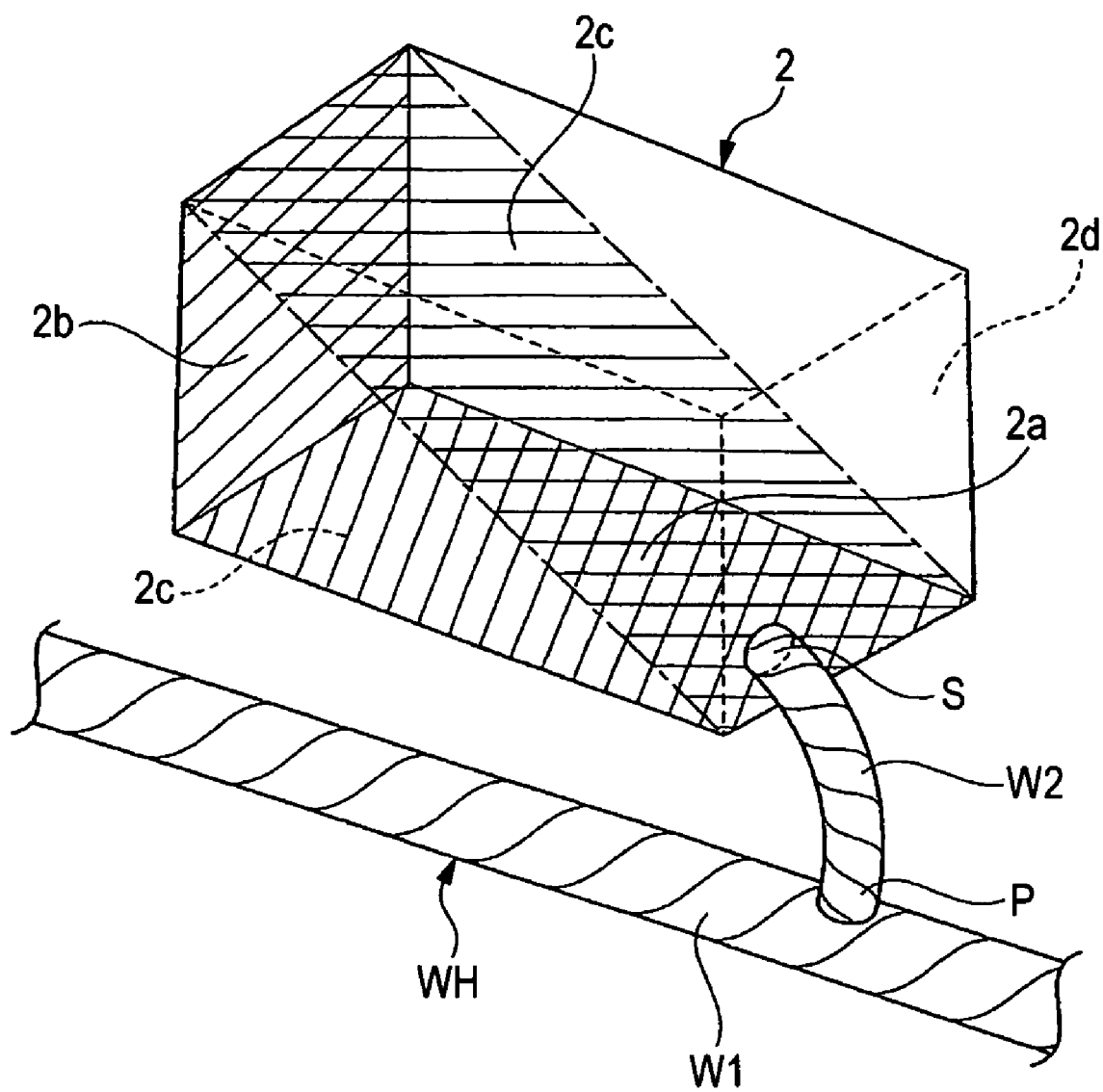
FIG. 2 is a perspective view showing those portions to which a branch wire of a wire harness can be connected.
Figure 3:
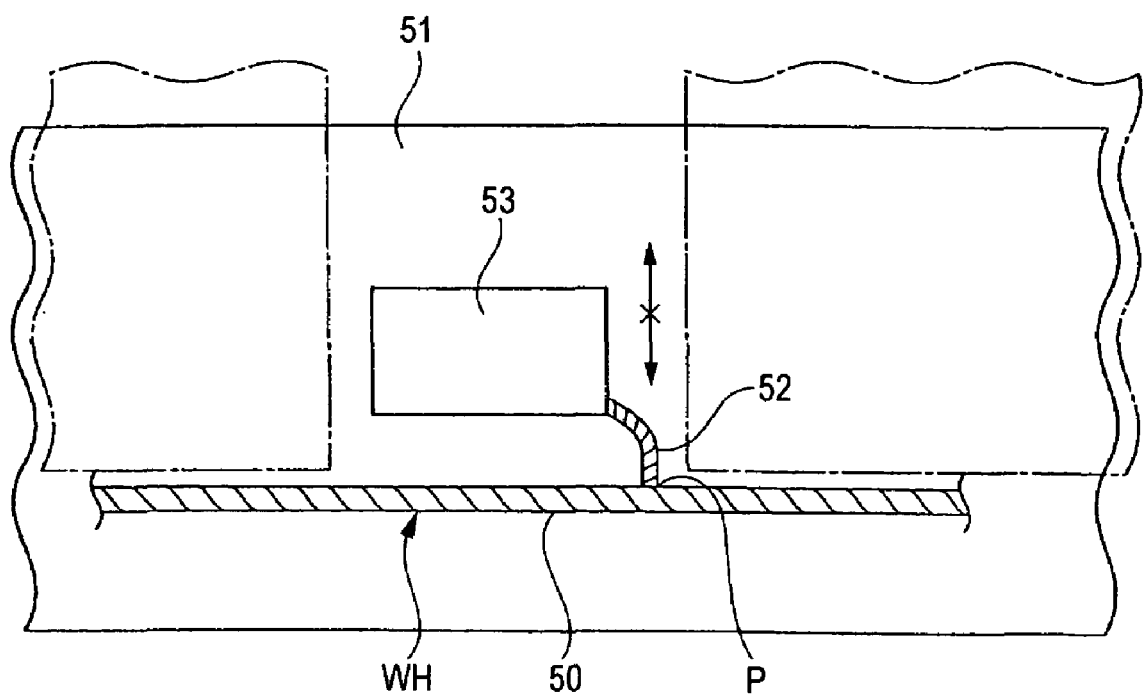
FIG. 3 is a view showing a conventional wire harness installation structure, showing its construction.

FIG. 1 is a view showing one preferred embodiment of a wire harness installation structure of the invention, showing its construction, and FIG. 2 is a perspective view showing those portions to which a branch wire of a wire harness can be connected.

As shown in FIG. 1, a main wire W1 of the wire harness WH is fixed to a vehicle body panel 1, and is installed along a predetermined path. The branch wire W2 branches off from a predetermined portion of the wire harness WH, and this branch wire W2 is extended along the following path, and is connected at its distal end S to an electric connection box (mounting part) 2 mounted in a predetermined receiving position within a vehicle body.

Namely, the branch wire W2, branching off from the predetermined portion of the main wire W1 of the wire harness WH, is installed along a bottom surface (lower surface) 2a of the electric connection box 2 in such a manner that the distal end S of the branch wire W2 is led from the branching position P to a left corner portion (FIG. 1) of the electric connection box 2 at the bottom surface 2a thereof. This left corner portion is spaced a distance, larger than the shortest distance between the branching position P and the electric connection box 2, from the branching position P. In a mounting operation, the distal end S of the branch wire W2 is connected to the left corner portion (the farthest position) of the bottom surface 2a of the electric connection box 2.

In the above construction, the branch wire W2 has such a length that it extends from the branching position P of the main wire W1 of the wire harness WH to the left corner portion (the farthest position) of the bottom surface 2a of the electric connection box 2, and the operation for connecting the distal end S of the branch wire W2 to the electric connection box 2 and other operations can be carried out at a position into which the electric connection box 2 is drawn from the receiving position. And besides, during the operation for mounting the electric connection box 2 connected to the branch wire W2, the electric connection box 2 can be somewhat moved upward and downward (as indicated by arrows in FIG. 1) because of the sufficiently-long branch wire W2. Therefore the operations for mounting and removing the electric connection box 2 and other operations can be carried out easily.

Furthermore, the connecting operation and other operations can be effected at the position into which the electric connection box 2 is drawn from the receiving position. Therefore, even in the case where other mounting parts 3 are disposed in the vicinities of the receiving position, the operation for connecting the distal end S of the branch wire W2 to the electric connection box 2 and other operations can be easily carried out.

Furthermore, when the length of the branch wire W2 is smaller than the predetermined length because of a design error or the like, this error or the like can be absorbed, and also even in the case where the main wire W1 and the branch wire W2 of the wire harness WH are both thick, the above operations can be carried out easily.

As described above, the branch wire W2 of the wire harness WH is installed along the bottom surface 2a of the electric connection box 2, and by doing so, the distal end S of the branch wire W2 is led from the branching position P to the farthest portion (farthest position) of the bottom surface 2a of the electric connection box 2, and is connected thereto. Therefore, a space for receiving the branch wire W2 is hardly necessary, and the electric connection box 2 can be received in a receiving space which is generally equal to that used in the conventional structure.

When the electric connection box 2 is moved from the receiving position toward the drawing position, the branch wire W2 is also drawn, following the electric connection box 2. In the operation for drawing the electric connection box 2, it is not necessary to take the existence of the branch wire W2 into consideration, and the electric connection box 2 can be easily and smoothly drawn.

In the above embodiment, although the distal end S of the branch wire W2 is connected to the bottom surface 2a of the electric connection box 2, the distal end S can be connected to those portions of the electric connection box 2 indicated by hatching in FIG. 2 except the portion of the electric connection box 2 disposed the nearest to the branching position P, and more specifically the distal end S can be connected to a rear surface 2b of the electric connection box 2 and a triangular portion of each of opposite side surfaces 2c thereof lying from a diagonal line thereof to the rear surface 2a and the bottom surface 2a. Namely, a front surface (one surface) 2d of the electric connection box 2 which extends just upwardly from the nearest position (which is the nearest to the branching position P of the branch wire W2) is excluded.

In the above embodiment, although the electric connection box is used as the mounting part, the invention can be applied to various mounting parts such as a joint box, a fuse box, a relay box, a connector block, a connector of a molding protector, an auxiliary equipment and an electronic unit.

What is claimed is:

1. A wire harness installation structure comprising:

a main wire of a wire harness is installed in such a manner that the main wire is fixed to a vehicle body panel;

a branch wire branching off from the main wire of the wire harness; and a mounting part connected to the branch wire is mounted in a predetermined receiving position within a vehicle body, wherein the branch wire is connected to a portion of the mounting part which is located farther away from a branching position of the branch than the shortest distance defined between the branching position of the branch wire and the mounting part in a mounted condition of the mounting part, and is disposed on a surface of the mounting part other than a surface thereof which extends upwardly from a portion of the mounting part disposed nearest to the branching position.

2. A wire harness installation structure according to claim 1, the branch wire is installed along a lower surface of the mounting part such that the branch wire is led from the branching position to a portion of the lower surface with a distance larger than the shortest distance between the branching position and the mounting part.

3. A wire harness installation structure according to claim 1, wherein the branch wire is connected to a bottom surface of the mounting part.

* * * * *